(12) United States Patent
Alexandre et al.

(10) Patent No.: US 10,679,517 B2
(45) Date of Patent: Jun. 9, 2020

(54) METHOD OF LEARNING CUTTING BY COMBINING SIMULATION ENTITIES, AND HYBRID IMPLEMENTATION PLATFORM

(71) Applicant: AFPA AGENCE NATIONALE POUR LA FORMATION DES ADULTES, Montreuil (FR)

(72) Inventors: Jean Pierre Alexandre, Toulose (FR); David Sanchez, Saint Orens de Gameville (FR); Fabrice Baeli, Saint Cloud (FR)

(73) Assignee: AFPA AGENCE NATIONALE POUR la formation Des Adultes, Montreuil (FR)

( * ) Notice: Subject to any disclaimer, the term of this patent is extended or adjusted under 35 U.S.C. 154(b) by 286 days.

(21) Appl. No.: 15/572,903

(22) PCT Filed: May 9, 2016

(86) PCT No.: PCT/EP2016/060260
§ 371 (c)(1),
(2) Date: Nov. 9, 2017

(87) PCT Pub. No.: WO2016/180746
PCT Pub. Date: Nov. 17, 2016

(65) Prior Publication Data
US 2018/0286278 A1    Oct. 4, 2018

(30) Foreign Application Priority Data

May 11, 2015 (FR) ...................................... 15 00971

(51) Int. Cl.
*G09B 19/00* (2006.01)
*G09B 19/24* (2006.01)
(Continued)

(52) U.S. Cl.
CPC ......... *G09B 19/24* (2013.01); *G02B 27/0172* (2013.01); *G09B 5/065* (2013.01);
(Continued)

(58) Field of Classification Search
CPC .......... G09B 19/24; B23K 9/00; B23K 9/095; A42B 3/042; A63H 33/3072
See application file for complete search history.

(56) References Cited

U.S. PATENT DOCUMENTS 4,207,935 A * 6/1980 Lambert ................. A63H 29/20
144/1.1
4,713,036 A * 12/1987 Moomaw ........... A63H 33/3072
434/260
(Continued)

FOREIGN PATENT DOCUMENTS

EP        2863376        4/2015

*Primary Examiner* — Peter R Egloff
(74) *Attorney, Agent, or Firm* — Defillo & Associates, Inc.; Evelyn A Defillo (57) ABSTRACT

The invention is aimed at providing a device for learning, with no danger of accident, while complying with the conditions of actual cutting, by proposing to combine virtual equipment for cutting and resistance to the advancing of the cut with tangible supports of material to be cut. A hybrid facility according to the invention includes a numerical management unit for managing exercises, a cutting table, a stereoscopic videoprojector of a stationary cutting machine, a stereoscopic camera for tracking the position of a tangible workpiece of an operator equipped with markers, a control touch screen linked with the management unit and a tangible workpiece to be cut virtually. The projected machine is viewed by an operator equipped with 3D viewing goggles and said videoprojector is combined operationally with the stereoscopic tracking camera associated with position markers equipping said workpiece and said operator.

17 Claims, 7 Drawing Sheets

(51) Int. Cl.
  *G02B 27/01* (2006.01)
  *G09B 5/06* (2006.01)
  *G09B 9/00* (2006.01)
  *H04N 13/204* (2018.01)
  *H04N 13/332* (2018.01)
  *H04N 5/33* (2006.01)

(52) U.S. Cl.
  CPC ............. *G09B 9/00* (2013.01); *G09B 19/003* (2013.01); *G02B 2027/0134* (2013.01); *G02B 2027/0178* (2013.01); *H04N 5/33* (2013.01); *H04N 13/204* (2018.05); *H04N 13/332* (2018.05)

(56) References Cited

U.S. PATENT DOCUMENTS

| | | | |
|---|---|---|---|
| 5,423,359 A | 6/1995 | Aigner | |
| 7,984,735 B1 | 7/2011 | Hayes | |
| 2009/0240482 A1 | 9/2009 | Naganawa | |
| 2012/0022677 A1 | 1/2012 | SuzuKi | |
| 2013/0183645 A1* | 7/2013 | Wallace | G09B 5/02 434/234 |
| 2013/0288211 A1* | 10/2013 | Patterson | G09B 19/24 434/234 |
| 2014/0081459 A1 | 3/2014 | Dubois | |
| 2014/0272837 A1 | 9/2014 | Becker | |

\* cited by examiner

METHOD OF LEARNING CUTTING BY COMBINING SIMULATION ENTITIES, AND HYBRID IMPLEMENTATION PLATFORM

CROSS REFERENCE TO RELATED APPLICATION

This application is a national stage entry of PCT/EP2016/060260 filed May 9, 2016, under the International Convention claiming priority over French Patent Application No. 1500971 filed May 11, 2015.

TECHNICAL FIELD OF THE INVENTION

The invention relates to a method for learning the safe use of static cutting machines, in particular for various categories of cutting wood, but also other non-metallic materials: plastic, synthetic or composite materials, rigid foam panels, etc. This method makes use of an interaction of virtual and real entities to simulate the cutting process while at the same time reproducing the real conditions for executing such a cutting. The invention also relates to a hybrid platform, constituting a tool of the "augmented reality" type combining tangible and virtual reality means, designed for the implementation of such a method.

Static machines, more particularly dedicated to wood cutting (the term "off-cut" or "cut up" relates to the result on the workpiece of the "cut(ting)" operated by the machine)— in particular, band, circular or dimensioning saws, surface planing machines and routers—allow cut orientations (straight cut, profiled cut, edge trimming, cross-cutting, calibration for dimensioning saws and band saws) and millings (edge facing, routing, molding, profiling, for surface planing machines and routers).

Training centers for the professions relating to the cutting of non-metallic materials currently use teaching workshops that reproduce the work stations of the professional environment, with the same safety rules as those in force in the companies concerned. One aspect is indeed the need to anticipate the situations that may lead to workplace accidents associated with the use of such machines, in particular by taking into account the twin motion issues, that of the cutting tool and that of the material to be cut which moves in front of the cutting tool of the machine.

Accordingly, the learning of the cutting technique amounts to progressively teaching the attitude, the posture and the hand skills that the apprentice will need to master depending on the types of workpiece cut and on the material used, while at the same time taking into account the risks associated with each phase of the cutting process.

BACKGROUND OF THE INVENTION

The training courses are costly in terms of duration, of quantity of material to be cut up and of the significant number of trainers needed to allow the apprentice to progressively acquire such a mastery of the cutting process.

The duration of the training could be reduced when the risks of accident are limited by the installation of specific protection means close to cutting elements of the machines. Such means (shrouds, plates, guiding means, etc.) are for example described in the patent documents U.S. Pat. No. 7,984,735, U.S. Pat. No. 538,842 and U.S. Pat. No. 5,423,359.

However, these means are not adapted to the acquisition of the hand skills and of the posture necessary for the management of the danger, since the added protection means are aimed at masking the cause of the risk run. These protection means may prove to be effective in a professional context but are not appropriate in a learning context.

More recently, another approach has been developed in order to provide the use of simulation means to reconstruct a virtual environment for optimizing the safety conditions of the cutting process. Such an approach is presented for example in the patent documents US 20120022677 and US 20090240482. These documents are more particularly aimed at choosing the shape and the location of optimum off-cuts or of the cutting lines based on the detection of the workpiece to be cut, or else at controlling the areas of interference between the cutting tool and the material to be cut up.

These simulations do not provide suitable learning means in order to ensure a training optimized in time and in means, while at the same time allowing the management of the risks to be integrated into the cutting professions, in particular, but not exclusively, the wood cutting profession.

SUMMARY OF THE INVENTION

The invention is aimed, more precisely, at providing such learning means with no danger of accidents, while at the same time adhering to the main conditions of a real cutting process, by combining virtual equipment for cutting and for resistance to the cutting with tangible supports for material to be cut up together with a position detection for the material to be cut up and for the operator allowing the behavior of the apprentice to be monitored, analyzed and assessed.

More precisely, the subject of the present invention is a method of learning cutting of non-metallic materials by a static machine, comprising the following steps:

a cutting exercise being selected in a digital management unit, a stereoscopic image of a virtual static machine, chosen in a library of machines of the management unit with an appropriate cutting mechanism, is projected onto a cutting table and seen by an equipped operator as a three-dimensional view (3D);

according to the exercise, a tangible workpiece to be virtually cut up, detectable in position and comprising at least one magnetic interaction face, is virtually constituted by a material chosen within a library of materials of the management unit, the materials being defined by at least one hardness image;

the tangible workpiece to be virtually cut up and the operator are equipped so as to be captured by stereoscopic imaging for tracking positions, orientations and movements;

an electromagnetic reaction force, which initially equips the cutting table, is controlled in intensity by the management unit according to the exercise selected, to the hardness of the material, to the position of the workpiece to be cut up and/or to the movements/orientations of the operator so as to interact, during the advance of said workpiece, with at least one ferromagnetic face of this workpiece in order to exert a resistance to the advance of the cut corresponding to that generated by a real machine of the same type;

at least one safety area is projected around the cutting mechanism of said virtual machine, the dimensions of this area being adapted to the chosen cutting mechanism, and an alarm is triggered in the case of infringement of at least one safety area; and a level of learning of the operator is evaluated by an analysis of the execution of the exercise on the basis of rate of success of criteria relating to the cut regularity and/or the speed of execution, the positioning of the operator with respect to an ideal positioning and the adherence to safety with regard to the proximity of the safety area or areas.

According to particular embodiments:

a cladding of the workpiece to be virtually cut up is also projected as a stereoscopic image onto this workpiece, the cladding also covering any part cut off in the course of the exercise and the materials also being defined in the library by their texture corresponding to said cladding;

when the material of the workpiece to be cut up is wood, the intensity of the electromagnetic reaction force is weighted by a hardness image of the wood at a given cut point corresponding to the mean hardness of an image of material extruded perpendicularly to the surface of the table up to the level of this point by the management unit;

vibrations corresponding to the virtual cutting of said workpiece are also generated on the cutting mechanism as a function of the choice of the exercise, of the machine and of said material of the workpiece, and whose intensity is controlled by the management unit;

a generic audio accompaniment is provided, advantageously modulated by the intensity of the electromagnetic reaction force and vibrations generated, to the hardness of the wood and/or to the cutting mechanism;

the head and the hands of the operator are equipped so as to be sensed by infrared (IR) stereoscopic imaging for tracking positions, orientations and movements;

an accident area is defined within the safety area in immediate proximity to the cutting mechanism, and the reaction force is stopped and/or the exercise is halted when the operator infringes on one of the areas;

a fuzzy shadow area is projected as a stereoscopic image onto the hands of the operator in order to mask the workpiece to be cut up;

alternatively, a processing for subtraction of images of the hands of the operator is carried out in the monitoring imaging by the digital management unit in order to mask the workpiece to be cut up image by image;

the management unit is in communication with a dedicated server which stores teaching data and common data in the execution of various exercises;

the dedicated server hosts a training portal site accessible by a connection via a local network or the Internet and is made responsible, by the management unit, for delivering pages for access to the training portal to at least one terminal via an access protocol, for exchanging data with the management unit and for storing skills results data;

the communication of data between a management unit and the server is chosen from between an autonomous mode, in which the management unit and the dedicated server are hosted on the same website, a connected mode for several management units in which a site operates in autonomous mode and the other management units are connected to the server via a local network and/or the Internet, and a server mode in which the server communicates with the management units via a local network and/or the Internet.

The invention also relates to a hybrid platform for the implementation of the method defined hereinabove. Such a platform for learning the cutting of non-metallic materials by a static machine comprises at least one digital unit for the management of cutting exercises, a cutting table comprising a worktop, a stereoscopic videoprojector of static cutting machines, a stereoscopic camera for tracking positions, orientations and movements, a control and monitoring screen linked with the management unit and at least one tangible workpiece to be virtually cut up. The management unit incorporates libraries of operational characteristics of static cutting machines, of corresponding cutting mechanisms and of materials to be cut up, the projected machines being able to be viewed by an operator equipped with 3D display glasses. Said videoprojector is combined in operation with the stereoscopic camera for monitoring said tangible workpiece equipped with markers and an operator executing a cutting exercise on said table also equipped with markers. Such an association videoprojector/camera for image acquisition advantageously allows the perspective of the images projected to be adapted, via the management unit, as a function of the position and of the orientation of the head of the operator.

The stereoscopic monitoring camera is associated with position markers equipping said workpiece and said operator. The platform comprises an electromagnet controlled by the management unit arranged on the cutting mechanisms and designed to interact with at least one face of the workpiece to be cut up covered with a ferromagnetic layer. Also, at least one safety area is projected by the videoprojector around the cutting mechanisms of said machines.

According to some particularly advantageous embodiments:

the workpieces to be cut up are clad with images exhibiting textures of materials defined in the library of materials and projected onto the workpieces to be cut up by the stereoscopic videoprojector in cooperation with the stereoscopic camera for tracking positions, orientations and movements of the workpieces to be cut up;

a vibrating mechanism is arranged on the cutting mechanisms and is controlled by the management unit according to the exercises, to the cutting machines, to the cutting mechanisms and to the densities of the materials to be cut;

at least one loudspeaker is driven by the management unit as a function of the intensity of the electromagnet and of the vibrating mechanism;

an alarm controlled by the management unit is able to stop the electromagnet and/or the exercise in the case of an encroachment into one of the areas situated inside of the safety area;

since the stereoscopic camera is an infrared camera, the head and the hands of the operator are equipped with IR camera markers, in particular the frames of the 3D display glasses are equipped with markers and the hands of the operator are equipped with trackers;

the cutting table comprises a worktop which is covered with a highly reflecting coating in order to optimize the stereoscopic projection;

modeled mobile mechanisms, in particular cutting mechanism protectors and lateral guides for the tangible workpieces to be virtually cut up associated with positional adjustment means, are projected by the videoprojector;

visual aids for the cutting may be projected by the videoprojector;

the digital management unit is connected to a server for storing data that may be transmitted via a local network or the Internet, the management unit and the server being disposed on a shelf installed under the worktop or near to the cutting table.

BRIEF DESCRIPTION OF THE DRAWINGS

Other data, features and advantages of the present invention will become apparent upon reading the non-limiting description that follows, with reference to the appended figures which respectively show.

DETAILED DESCRIPTION OF THE INVENTION

In the various figures, identical elements or parts of elements carry the same reference. The description of the same element shown in various figures is referenced to the passage that deals with it in detail.

In the text, the qualifying terms "vertical", "horizontal", "upper", "lower" or equivalent expressions denote the position of an element in the conventional use with respect to an orthonormal reference frame OXYZ defining a Z axis parallel to the earth's gravitational force, and an XY plane perpendicular to the Z axis.

Figure 1:
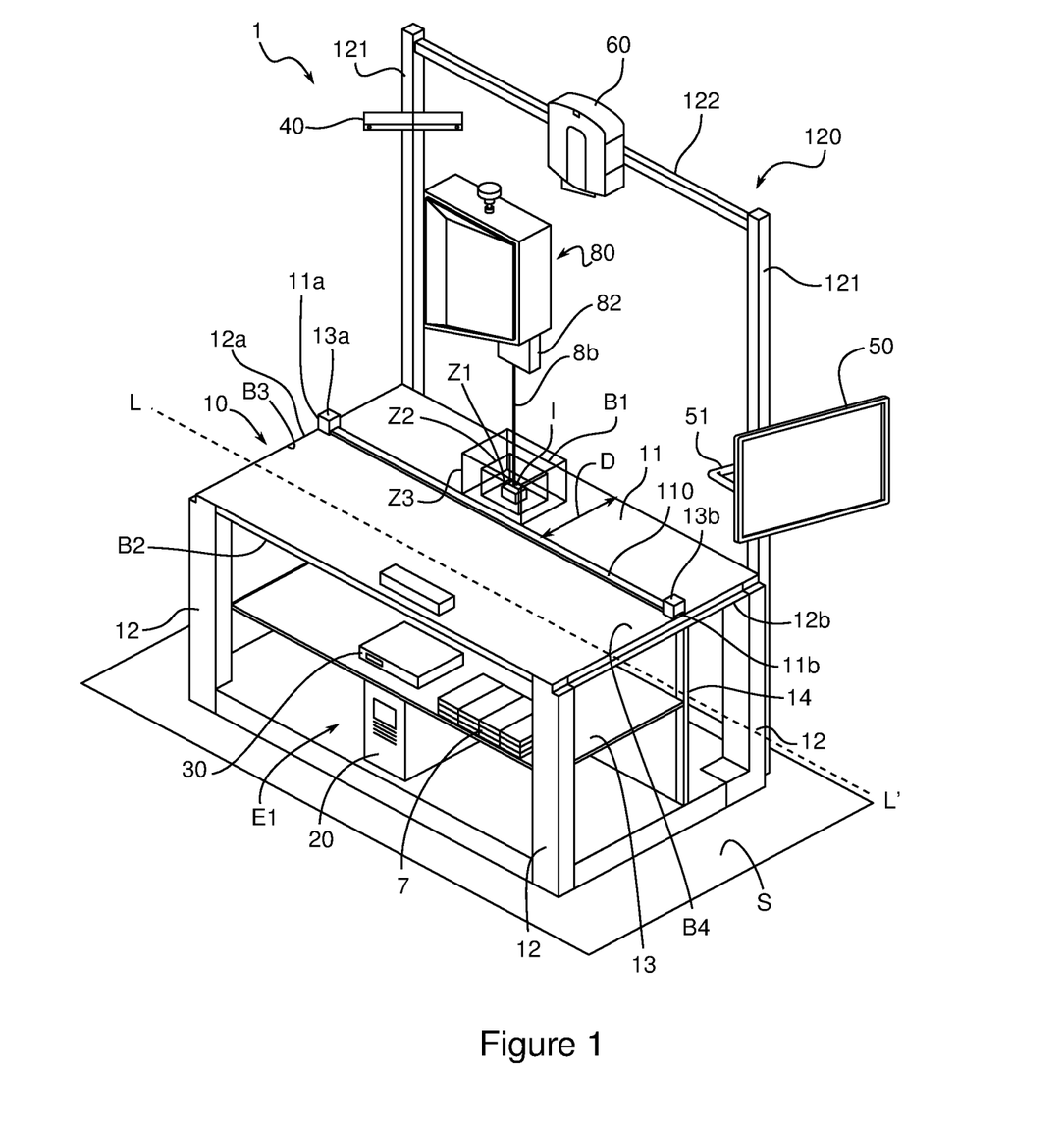
FIG. 1, a perspective view of one example of a hybrid platform according to the invention.

The perspective view in FIG. 1 illustrates one example of a hybrid platform 1 according to the invention dedicated to the learning of wood cutting. Such a platform comprises a cutting table 10, composed of a rectangular cutting worktop 11 and of four legs 12, and of a portal frame 120 whose vertical risers 121 are attached along two of the legs 12 situated at the ends of one longitudinal edge B1 of the worktop 11.

The table 10 has an intermediate shelf board 13 and a vertical reinforcement board 14 running parallel to the longitudinal axis LL' (parallel to the Y axis) of the worktop 11 at a shorter distance "D" from the longitudinal edge B1—around ⅓ of the width—than that which separates it from the other longitudinal edge B2 of the worktop 11. A lateral cutting guide 110 is formed on the worktop 11 at the same distance D from the longitudinal edge B1 as the reinforcement board 14 situated under the worktop 11. The lateral guide 110 has end stops which are associated with position adjustment spigots 11a, 11b, these spigots 11a, 11b being designed to slide in guide grooves 12a, 12b formed on the transverse edges B3, B4 of the worktop 11 along the X axis. This guide 110 allows a tangible workpiece 70, which is to be virtually cut up, to be moved in translation. The spigots 11a, 11b are used, in particular, in the cutting exercise referred to as "stopped routing".

In addition, a lower board 15 in contact with the ground "5" connects the ends of the legs 12 resting on the ground "5". In the shelf space E1 formed by the intermediate 13 and reinforcement 14 boards, a computer 20 incorporating a digital management unit in connection with a server for storing teaching data 30 is installed.

The server 30 exchanges cutting learning exercise data with the management unit and delivers the pages of a "training" portal via a local network or the Internet. Since all of this electronic and data processing equipment is sensitive to variations in the electrical voltage, an inverter is advantageously provided on the electrical power supply circuit.

Furthermore, a stereoscopic camera IR 40 and a control and monitoring touchscreen 50 (hereinafter "control screen") are respectively fixed onto one and the other vertical riser 121 of the portal frame 120. The control screen 50 is orientable via an articulation arm 51. The risers 121 are connected at their upper ends by a beam 122 onto which a stereoscopic videoprojector 60 is fixed. The cabling for connection of the IR camera 40, of the videoprojector 60 and of the control screen 50 to the computer 20, and for connection of this equipment to an electrical line supply pass through the beam 122 and the risers 121 of the portal frame 120.

The tangible workpiece 70, placed on the worktop 11, is designed to be virtually cut up according to an exercise selected by the operator. For this purpose, the operator acts on the page of the control screen 50 edited by the management unit of the computer 20 for selecting the various parameters defining the exercise: type of cutting machine, type of cut to be performed, hardness of the wood, tangible workpiece defined by its dimensions, parameters for deformation of the flat face and of the edge (for surface planing machines), cut settings (cutting or milling: dimensions, depth of cut, etc.), actions to be carried out, level of expertise.

The tangible workpiece 70 belongs to a set 7 of five workpieces (the four other workpieces are stored in the space E1) of variable dimensions and adapted to the corresponding exercises. In order to define the cutting exercises, the management unit of the computer 20 incorporates libraries of operational characteristics for static cutting machines, for cutting mechanisms and for various types of wood to be cut up. The wood is defined by its texture and its hardness which varies as a function of the texture.

The tangible workpiece 70 to be virtually cut up, together with the head and the hands of the operator, are equipped with markers (cf. FIGS. 6a and 6b) so that the IR camera 40 can monitor their positions, orientations and movements.

A static cutting machine, a band saw 80 in the example illustrated (only its upper part is shown in order to simplify FIG. 1), being selected, the stereoscopic videoprojector 60 projects it on top of the worktop 11. The blade 8b of the saw 80 passes through the worktop 11 at the point of impact "I" and the lateral cutting guide 110 is retracted in the rear position on the worktop 11. This band 8b is protected by a protection mechanism 82 adjustable during the virtual cut. The projected band saw 80 and its accessories (blade 8b, protection mechanism 82) are viewed by the operator equipped with 3D display glasses (cf. FIG. 6a).

The analysis of the images projected by the videoprojector 60 such as seen by the IR camera 40 allows the management unit, by combining these images with the monitoring of the position and movements of the operator also carried out by the IR camera 40, to adapt the perspective of the images projected to the position and to the orientation of the head of the operator. The position and the orientation of the head of the operator thus determine the combination of the projected images in order to generate the environment in 3D.

Safety areas are also projected by the videoprojector 60 around the cutting blade 8b. Alternatively, these safety areas may be projected on and/or in front of the blade 8b. The dimensions and shape of these areas are adapted to the cutting mechanism chosen for the exercise. In the example, the safety areas are composed of three areas Z1, Z2 and Z3, forming three congruent rectangular parallelepipeds centered on the cutting blade 8*b*: the accident area Z1 bounded by the blade 8*b*, the protection area Z2 bounded by the protection mechanism 82 and encompassing the accident area Z1, and the alarm area Z3 encompassing the protection area Z2.

The dimensions and the transparency of these areas Z1 to Z3 are parameters of the simulation linked to the learning: the areas are visible and permanently colored in "beginners" mode (with a change of color of the alarm area Z3 in the case of infringement), only with the approach of the hands to the alarm area Z3 in "advanced" mode, and invisible in "expert" mode. A visual alarm is triggered on the control screen 50 in the case of an encroachment into the alarm area Z3. In any case, the entry of a hand into the protection area Z2 triggers the interruption of the exercise.

Figure 2:
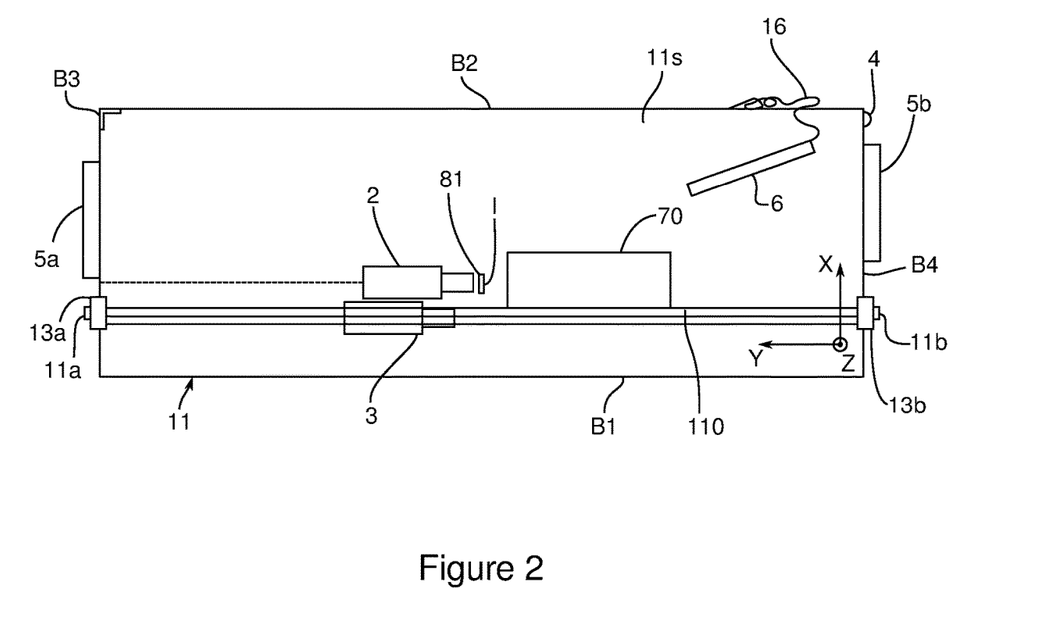
FIG. 2, a top view of the cutting table of the hybrid platform in FIG. 1, prior to the implementation of a cutting exercise.

The top view of the cutting worktop 11 is illustrated in FIG. 2. In order to optimize the stereoscopic projection, the worktop 11 is covered with a highly reflecting coating, here made of white plastic material, on its upper face 11*s*.

In addition, an electromagnet 2 (seen in transparency), controlled by the management unit, is arranged under the worktop 11 near to the impact "I" of the virtual cutting mechanism. The electromagnet 2 allows the translational movement in the XY plane and rotational movement about the Z axis of the tangible workpiece 70 to be simultaneously slowed down. The management unit defines the variation of the force of attraction and the surface of interaction of the electromagnet 2 with the tangible workpiece 70 as a function of the design conditions of the exercise and during the course of the exercise, namely: the reference force to be exerted by the apprentice on the workpiece, the hardness and the quantity of material to be removed in one go.

Furthermore, a vibrating mechanism 3 (also shown in transparency), here a vibrating blade, is also arranged under the worktop 11, close to the electromagnet 2. The vibrating mechanism 3 is activated with the electromagnet 2 and its intensity of vibration is controlled by the management unit via the processing loop of the computer 20 (FIG. 1). Owing to the fact that cutting machines are rotating machines and themselves cause vibrations in interaction with the wood to be cut up, the vibrating mechanism 3 is thus dedicated to forming vibrational movements of the type of those that would be caused by the real cutting machine corresponding to the virtual machine selected according to the conditions of the exercise provided.

An emergency stop button 4, positioned on one transverse edge B4 of the worktop 11, allows the power supply of the electromagnet 2 to be interrupted in an emergency, for example when a safety area near to the cutting blade 8*b* is infringed by the operator. Advantageously, the emergency stop is integrated into the simulation. Thus, when the operator actuates the emergency stop button 4, the simulation reacts like a real machine (progressive shutdown of the motor, interruption of the exercise, etc.).

In order to complete the realism of the simulated cutting, the system is advantageously equipped with two loudspeakers 5*a* and 5*b* fixed on either side of the worktop 11 for simulating the noise of the machine. The loudspeakers 5*a*, 5*b* are also driven by the management unit of the computer 20 as a function of the force exerted by the electromagnet 2 and of the intensity of the vibrations generated by the vibrating mechanism 3. The audio feedback is thus integrated into the processing loop of the computer 20 starting from the contact of the cutting blade 8*b* with the tangible workpiece 70, taking into account the hardness of the material to be virtually cut up, or from the start-up of the machine which communicates vibrations to the table 10 (FIG. 1).

In addition, the operator conventionally disposes of a pusher 6 for clearing away virtual off-cuts or for pushing the tangible workpiece 70 in order to finish off the cutting or milling action when the hands are too close to the cutting mechanism 8*b*. The pusher 6 is attached to the edge B2 of the worktop 11 by means of a flexible cord 16. Advantageously, the pusher 6 may be equipped with markers in order to track its position by means of the IR camera 40 (FIG. 1).

During the exercise, the position of the lateral guide 110—with its end stops 13*a*, 13*b* coupled to the spigots 11*a*, 11*b*—may become maladjusted owing to the significant forces generated by the operator on the tangible workpiece 70. In order to allow the operator to reposition it correctly, the videoprojector 60 (FIG. 1) projects simplified virtual views of these elements following a precise parameter setting to be executed. The operator then makes the physical elements (guide 110, spigots 11*a* and 11*b*) correspond to the projected virtual elements. It is thus not necessary to project a transporting carriage for the workpiece to be cut up.

Figure 3:
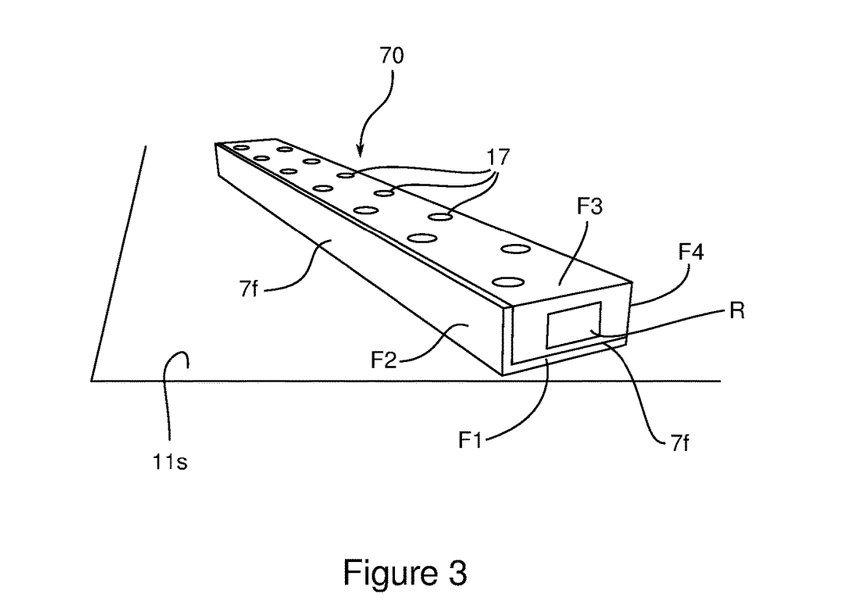
FIG. 3, a perspective view of a tangible workpiece to be cut up in one learning exercise according to the invention.

The perspective view in FIG. 3 illustrates the tangible workpiece 70, with an identifier labeled "R", on the upper face 11*s* of the worktop 11 seen partially.

The tangible workpieces such as the workpiece 70 have a parallelepipedic shape and are covered, on two faces F1 and F2, referred to as active faces—a flat face F1 and an edge face F2 —, with a ferromagnetic layer 7*f*. The two other faces F3 and F4, respectively opposite to the active faces F1 and F2, are covered with a constellation of IR markers 17. The interaction between the electromagnet 2 and the tangible workpiece 70 only operates if one of the active faces F1 or F2 is in contact with the upper face 11*s* of the worktop 11.

The quantity of IR markers 17 per workpiece 70 is determined so as to be able to guarantee a continuity of the position and movement tracking even when both hands of the operator are hiding some of these markers 17.

Generally speaking, the workpieces to be virtually cut up 70 are clad by images projected by the videoprojector 60 in cooperation with the IR camera 40 (FIG. 1) for tracking positions, orientations and movements of said workpieces 70, and representing textures of wood defined in the library of the materials.

The cutting workpieces, cut up by cutting machines—dimensioning and band saws —, are distinguished from the milling workpieces cut up by the milling machines—surface planing machines and routers.

The cutting workpieces are always placed on the flat surface, face F1 in the example, and do not require any virtual deformation: the cutting actions are carried out perpendicularly to the worktop 11 which allows the workpiece to be worked over a cut in 2D, then the 3D to be generated by extrusion.

Figure 4A:
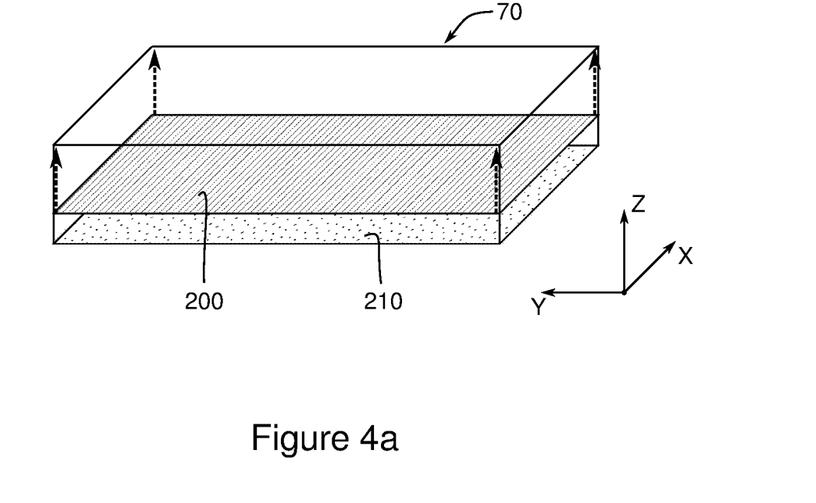
FIGS. 4a and 4b, a perspective view of cladding of a tangible workpiece (FIG. 4a) by "material" images virtually extruded from the cutting table and allowing the mean hardness of a wooden workpiece to be defined at any point at any given cutting level (FIG. 4b)

The "material" images, also referred to as "claddings", are thus extruded along the Z axis for the cutting workpieces and FIG. 4*a* illustrates a perspective view of such an extruded "material" image 200. The "material" image 200 of a virtual workpiece made of wood adheres to the dimensions of the tangible board 70 onto which it is projected in order to avoid the visual distortion effects when the image is projected.

Figure 4B:
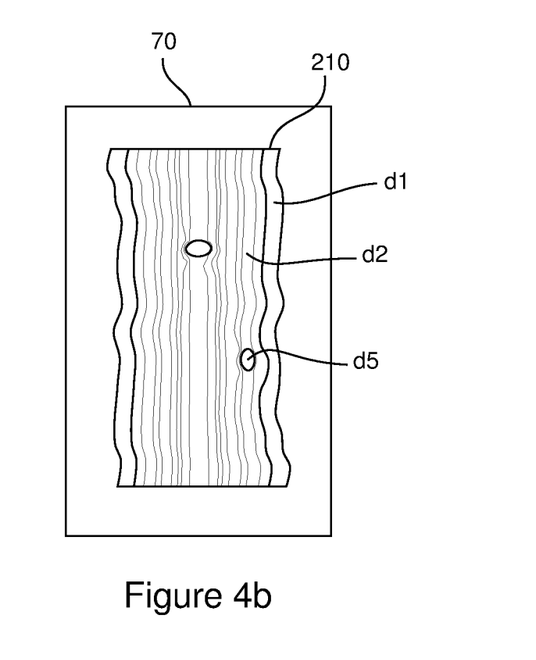

A "hardness" image 210, uniformly distributed along the Z axis, is associated with this "material" image 200. Each pixel of a "hardness" image 210 corresponds to a normalized hardness value, here between dl and d5, as illustrated by the top view in FIG. 4b.

The intensity of the reaction force supplied by the electromagnet 2 (FIG. 2) is weighted by the hardness of the real workpiece to be cut up listed in the exercise selected. The extruded images then allow the mean hardness of the real workpiece to be determined at every point of any virtual cut level determined by the management unit and to be deduced from this the force of the intensity of the electromagnet 2 to be applied.

With regard to the milling workpieces, they are placed on the flat face or on the edge, faces F1 or F2 in the example, and require virtual deformations (the workpiece being flattened, hollow or curled). The management unit uses a technique based on "displacement imaging" from which the 3D workpiece is generated.

The workpiece made of wood is in fact generated starting from two images respectively extruded along the Z (the flat face) and X (the edge) axes. The extrusion is then non-uniform and is a function of the "displacement image". The milling then acts directly on this image and implicitly on the topography of the virtual workpiece.

The four types of workpiece made of wood can thus be simulated: standard workpiece (without deformation), flattened workpiece (with roughness on the flat face and on the edge), curled workpiece (with a deformation flexion on the flat face in the direction of the width and roughness on the edge), and hollow workpiece (with a deformation flexion on the flat face in the direction of the length and roughness on the edge).

Figure 5A:
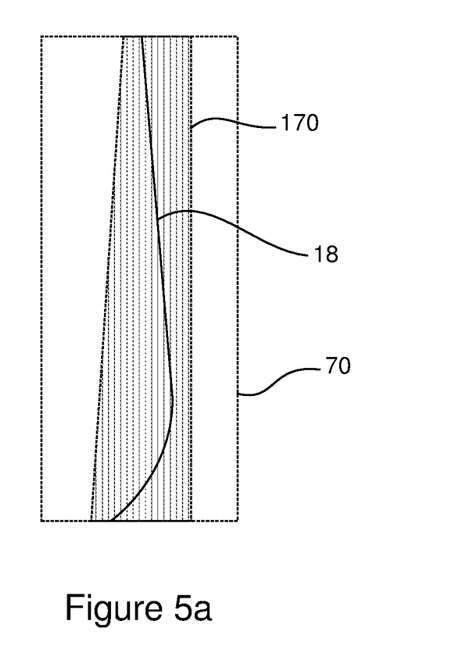
FIGS. 5a and 5b, a top view of a virtual workpiece to be cut up corresponding to particular settings of cutting exercises, and a top view of an image cladding a workpiece to be cut up after orientation by the operator in order to optimize his/her positioning prior to the cutting.

Furthermore, particular instructions may be requested by the exercise. The top view in FIG. 5a illustrates a virtual workpiece to be cut up with cladding 170 on the tangible workpiece 70 indicating a cut instruction for the band saw 80 (FIG. 1), namely the curved track 18.

Figure 5B:
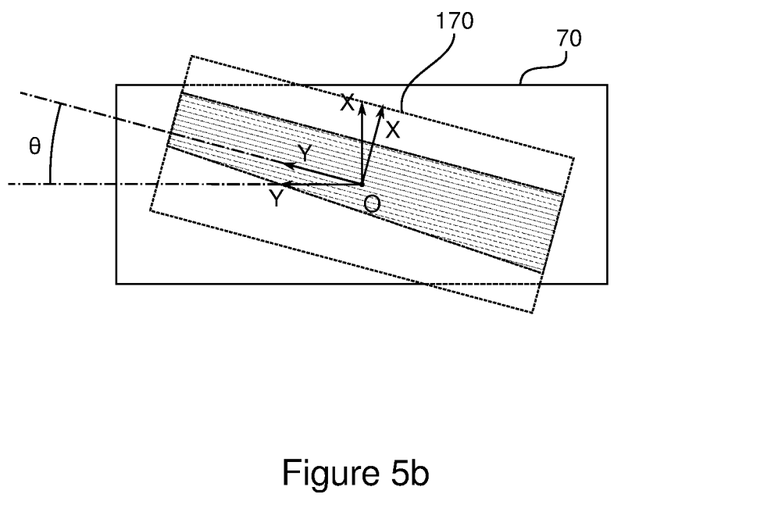

In addition, in order to optimize a cut subsequent to the preparation instruction for an exercise—here a square facing of the edge—the operator may be required to orient the "material" image 170 at an angle θ with respect to the tangible workpiece 70, as illustrated on the top view in FIG. 5b with reference to the XY reference frame. For this purpose, he/she modifies the angle θ on the control and monitoring screen 50 (FIG. 1).

The execution of an exercise generally takes place in three phases: the preparation, the implementation and the finishing.

The preparation phase is carried out on the control screen 50 and consists in configuring the machine. Depending on the virtual machine and on the context of the exercise, the apprentice activates the safety mechanisms, the extraction, the light, etc.

When the station is correctly set up, the projection table is lit by the light projected from the videoprojector 60 and the apprentice is invited to put on the 3D display glasses together with the "left hand" and "right hand" trackers.

Figure 6A:
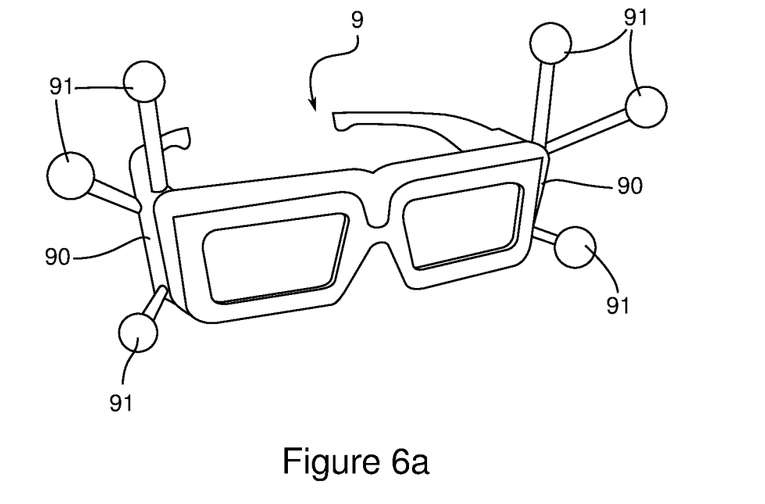
FIGS. 6a and 6b, one example of 3D display glasses and one example of hand equipment, the glasses and the equipment being equipped with position/movements markers.
Figure 6B:
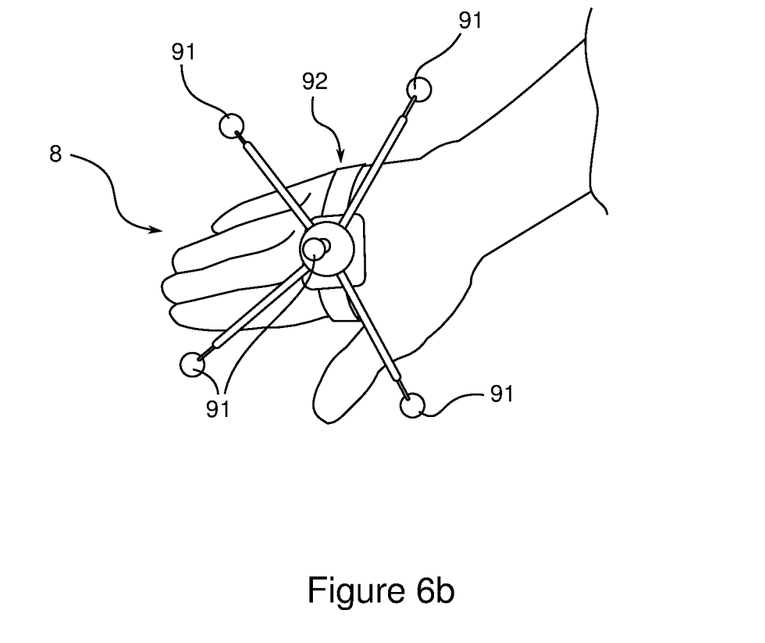

FIGS. 6a and 6b illustrate, respectively, one example of 3D display glasses and one example of hand equipment or tracker, the glasses and the tracker being equipped with markers for tracking the position/movements.

Thus, each hinge 90 of the 3D display glasses 9 is equipped with three IR markers 91 and each hand 8 of the operator is equipped with a "tracker" sleeve 92 on which five IR markers 91 are mounted.

The operator should be careful not to reverse the trackers 92 of the right hand and that of the left hand, respectively identified by a label "right" and "left". The hand tracker thus allows the management unit to track the position and the movement of the hands while distinguishing the right hand from the left hand via the IR camera 40 (FIG. 1). The 3D glasses with IR markers 91 allow the operator to correctly view the images projected by the videoprojector 60 (FIG. 1) and the management unit to determine the position and the orientation of the head of the operator via the IR camera 40.

In order to illustrate a few phases of cutting exercises with various machines, FIGS. 7a to 7d show schematically the top view of the cutting worktop 11 during the implementation of these various phases. The cutting machines in question are a dimensioning saw for an edge trimming and a cross-cutting (FIGS. 7a and 7b), a band saw for an in-line edge trimming and a profiled cut (FIGS. 7c and 7d), a surface planing machine for the edge facing of a flattened piece of wood (FIG. 7e) and a router for a continuous routing (FIG. 7f).

During the preparation phase, the operator turns on the extraction and the machine, activates the protection, selects the correct cutting mechanism and goes to the next step.

According to the exercise, some adjustments require an appropriate physical action to be carried out on the cutting worktop 11, in particular the adjustment of the lateral guide 110, of the spigots 11a, 11b and of the tangible workpiece to be cut up 70 (FIG. 1). For this purpose, the apprentice makes the real elements correspond to the virtual elements projected onto the worktop 11.

During this phase, the positions of the tangible workpiece 70, of the head and of the hands of the operator are sensed. The videoprojector 60 projects a fuzzy shadow area onto the worktop 11 around the hands, in order to mask the tangible workpiece 70, and a "material" image onto the tangible workpiece 70. The cutting is carried out within the parallelepipedic volumes of the safety areas Z1 to Z3 (FIG. 1).

In the majority of the exercises, the operator can adjust the cutting orientation by rotating the cladding of the workpiece through 180° if the orientation does not correspond to that defined on the control screen 50 (FIG. 1).

When the exercise is finished, the operator takes off his/her 3D glasses 9 (FIG. 6a) and finishes off the exercise on the control screen 50 switching off the machine, the extraction, etc. The results are displayed on the control screen 50 (FIG. 1).

Figure 7A:
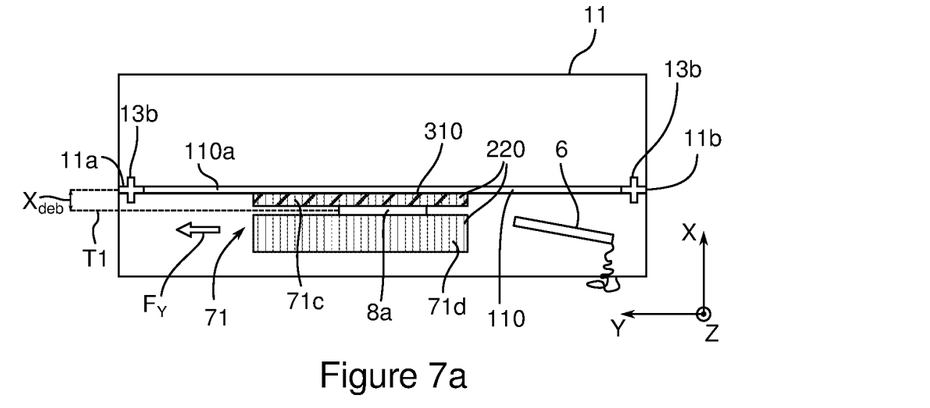
FIGS. 7a to 7f, a schematic top view of the cutting worktop during the implementation of phases of cutting exercises with various cutting machines.
Figure 7B:
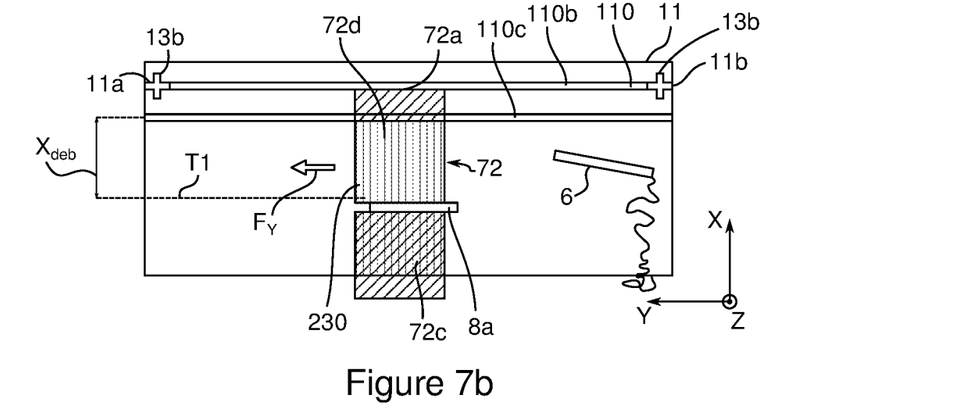

More particularly, the first two exercise examples illustrated by the top views in FIGS. 7a and 7b relate to the use of a dimensioning saw for, respectively, an edge trimming and a cross-cutting.

The edge trimming (FIG. 7a) consists in performing a straight cut at a distance $X_{deb}$ along one longitudinal edge (called "flank") 310 of a tangible workpiece 71 that needs to be firstly squared off.

In the preparation phase, the operator orients the wood cladding 220 on the control screen 50 as a function of the saw blade 8a in order to optimize the facing of the edge. A virtual line T1 is displayed on the screen 50 and projected onto the worktop 11 in the extension of the blade 8a. The cladding 220 is moved along the X axis and oriented along the Z axis.

Following this manipulation, the management unit determines and stores the position of the lateral guide 110 allowing the initial "edge facing" operation to be carried out making use of a virtual guide 110a as explained hereinbelow.

In the implementation phase, the virtual guide 110a is projected onto the worktop 11. After having put on the 3D glasses 9 and slipped on the hand trackers 92 (FIGS. 6a and 6b), the operator superposes the "real" lateral guide 110 and the virtual guide 110a. He/she pushes the edge of the workpiece 71 against the guide 110 and carries out the edge facing by moving the workpiece 71 along the Y axis (arrow Fy), so as to eliminate a virtual off-cut corresponding to the sapwood of the tangible workpiece with the aid of the pusher 6.

The management unit detects the end of the sequence via the IR camera 40 (FIG. 1) and the operator "repositions" the lateral guide 110 on the virtual guide 110a. After tightening end stops 13a, 13b onto the spigots 11a and 11b, the operator pushes the tangible workpiece 71 against the guide 110 and executes the edge trimming by moving the tangible workpiece 71 along the Y axis (arrow Fy) with the aid of the pusher 6. The operator subsequently removes the virtual workpiece cut off 71c (situated between the blade 8a and the guide 110), then virtually replaces the residual workpiece 71d upstream of the blade 8b in the management unit via the control screen 50 (FIG. 1). At the end of the exercise, the operator removes the tracking equipment, puts away the tangible workpiece 71 and returns to the control screen 50 in order to finish off the exercise.

In the case of cross-cutting (FIG. 7b) over a distance $X'_{deb}$ of the tangible workpiece 72, the management unit uses the lateral guide 110 to simulate the carriage for transporting the workpiece by way of assistance and thus facilitate the translation of the tangible workpiece 72 along the Y axis (arrow Fy). Two virtual guides 110b and 110c are projected, one (110b) on the position of the real lateral guide 110 and the other (110c) at the location of the position of the cladding 230. This disposition advantageously allows the positioning of the tangible lateral guide 110 to be optimized and to avoid the overhang.

This sequence consists in positioning the cladding 230 as a function of that of the blade 8a in order to optimize the initial facing of the edge. In order to aid the positioning of the cladding 230, a virtual line T'1 is displayed on the screen 50 and projected in the extension of the blade 8a.

The operator can move the cladding 230 along the X axis and orient it along the Z axis in a preparation phase. Following this manipulation, the management unit determines and stores the position of the virtual guide 110c and that of the real guide 110 then projects the virtual guides 110b and 110c to aid the positioning of the lateral guide 110 in the initial edge facing phase, similar to that of the previous example of edge trimming. The operator then superposes the real guide 110 onto the virtual guide 110b. He/she subsequently pushes the transverse edge 72a of the tangible workpiece 72 against the lateral guide 110. The operator then carries out the edge facing along the Y axis (arrow Fy). He/she subsequently places the lateral guide 110 superposed on the virtual guide 110c by means of the tightening of the spigots 11a, 11b and then carries out the cross-cutting by moving the workpiece 72 along the Y axis (arrow Fy) with the aid of the pusher. The operator subsequently removes the virtual workpiece cut off 72c, then virtually replaces the residual workpiece 72d upstream of the blade 8a in the management unit via the control screen 50 (FIG. 1).

Figure 7C:
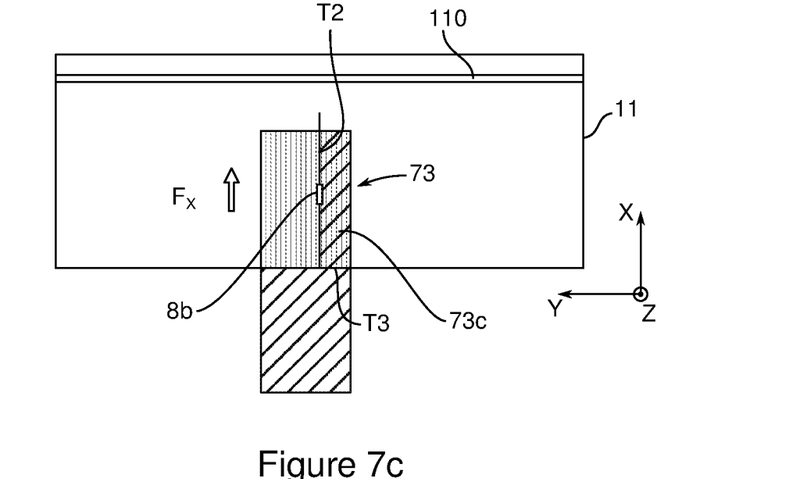
Figure 7D:
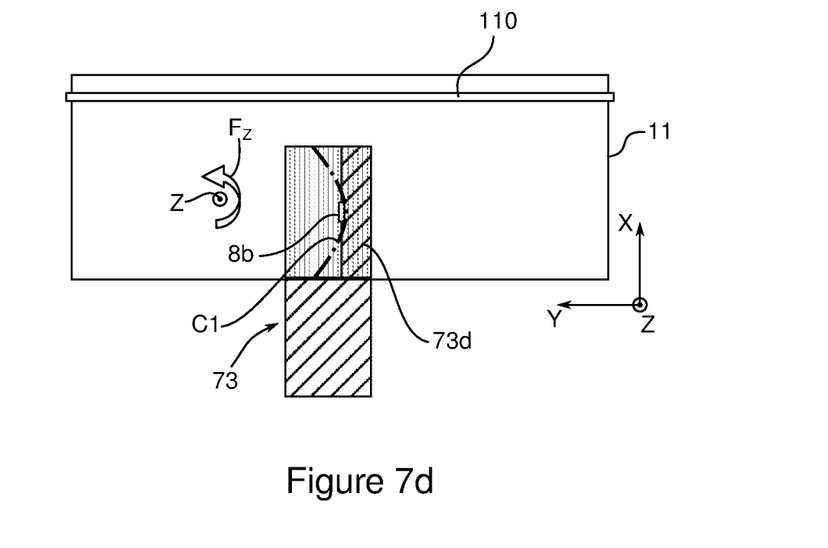

The following two exercise examples, illustrated by the top views in FIGS. 7c and 7d, relate to the use of a band saw for, respectively, an in-line edge trimming and a profiled cut (FIG. 7d).

With regard to the in-line edge trimming T2 (FIG. 7c), the operator positions the tangible workpiece 73 facing the blade 8b and aligns it along the line T2. The operator then carries out the complete saw cut along the X axis (arrow Fx), then repositions the tangible workpiece 73 upstream of the blade 8b.

The management unit via the IR camera 40 detects the end of this first sequence and displays the second cut line T3. The operator performs the second saw cut following the line T3. Once the second saw cut has been carried out, the operator ejects the virtual off-cut 73c then repositions the tangible workpiece 73 upstream of the blade 8b.

This being the profiled cut (by a combination of linear sawing along Fx and in rotation along Fz around an axis parallel to the Z axis in FIG. 7d), the operator follows the line of a curve C1 whose radius keeps the same sign. The operator positions the tangible workpiece 73 to be profile cut with the blade 8b. The operator then carries out the complete saw cut and repositions the tangible workpiece 73 upstream of the blade 8b in order to carry out an in-line edge trimming and virtually remove the off-cut 73d.

With a surface planing machine, the exercise that follows (FIG. 7e) relates to the edge facing of a piece of flattened wood by milling (and, in an equivalent manner, to the edge facing of a curled or hollow workpiece, informing the management unit of the ideal position of the workpiece).

Figure 7E:
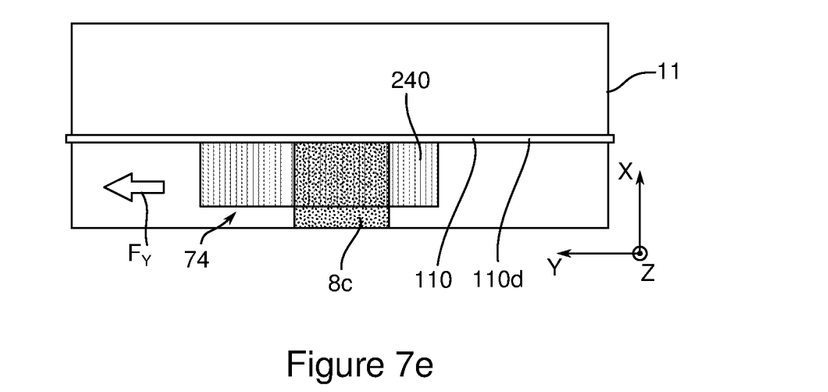
Figure 7F:
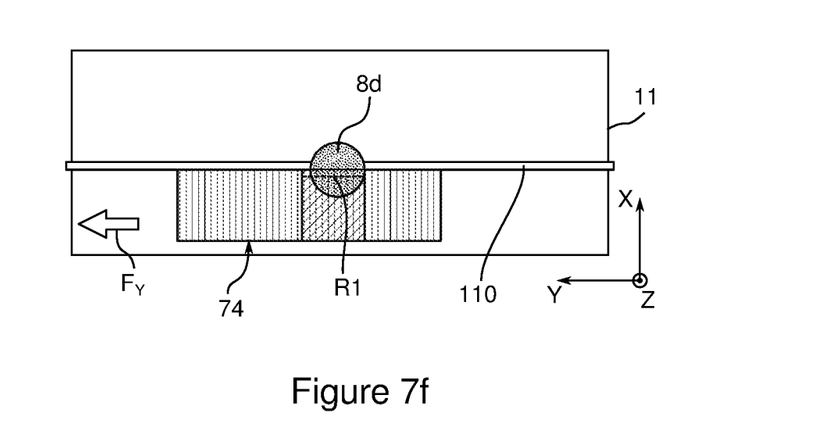

During the preparation phase, the operator configures the depth of cut on the control screen 50 as a function of the value of roughness of the cladding 240 provided. The videoprojector 60 then projects the virtual guide 110d and the operator superposes the real lateral guide 110 onto the virtual guide 110d. He/she places the flat face of the tangible workpiece 74 on the worktop 11 and pushes the edge of this workpiece against the lateral guide 110. The milling is carried out by exerting a force along the Y axis (arrow Fy) by passing over the cutting tool 8c turning around an axis parallel to the X axis. When the operator has finished the first "pass", he/she verifies the surface state of the tangible workpiece 74 downstream of the cutting tool 8c in the following manner.

By slightly raising the tangible workpiece 74, the operator indicates to the management unit that he/she wishes to view the cladding of the "underneath" of the milled workpiece. A "material" image of the result is then projected. Depending on the estimated quality of the surface state, the operator then chooses to carry out a new cut or to finish off the exercise by a facing of the edge. Between each cutting pass, the operator can modify the depth of cut on the control screen 50.

The facing of the edge is carried out in an equivalent manner to the flank facing by pushing the flank against the lateral guide 110.

The last exercise example relates to a continuous routing (FIG. 7f). The router disposes of a dual cutting mechanism 8d which rotates on an axis parallel to Z and allows a groove R1 to be formed. The operator places the tangible workpiece 74 with its flat face on the worktop 11, then pushes its edge against the lateral guide 110. The milling is implemented along the Y axis (arrow Fy) by passing in front of the cutting tool 8d. When the operator has finished the milling, he/she repositions the workpiece 74 upstream of the dual cutting mechanism 8d, the workpiece remaining face down on the worktop 11.

The invention is not limited to the exemplary embodiments described and shown. Thus, the level of learning of the operator for a given exercise may be assessed by an analysis of the execution of this exercise. The analysis is carried out on the basis of success rate of cut regularity criteria, of speed of execution, of positioning of the operator, in particular of their hands, with respect to an ideal positioning and the adherence to safety with regard to the proximity of their hands to the safety areas Z1 to Z3.

Thus, the regularity of the cut may be evaluated by comparing the ideal track to that printed by the cutting mechanism on the workpiece.

For a given exercise, it may be sampled over the whole of the cut and corresponds to the average of the distance between the center of the cutting mechanism and the ideal position.

For the milling exercises, this criterion may correspond to the maximum distance of the tangible workpiece to the lateral guide and allow it to be determined whether the operator is correctly pushing the workpiece onto the lateral guide.

Moreover, the speed of movement corresponds to the speed of movement of the tangible workpiece handled by the operator. With this criterion, the management unit monitors the value and the constancy of the speed throughout the whole exercise.

With regard to the position of the hands, this is evaluated by comparing the ideal position to that of the operator and is sampled over the whole of the cutting process. The criterion may be based on a tolerance interval corresponding to the maximum offset between the center of the hand and the ideal position.

The evaluation phase of the system will allow the precision of the tracking of the orientation of the hands of the operator to be analyzed. The orientation of the hands may be evaluated to more precisely qualify the hand actions.

Finally, for the adherence to the protection area, this criterion may define the scale factor to be applied to the protection area Z2 in order to obtain the accident area Z1 (lower tolerance limit) and the alarm area Z3 (upper tolerance limit). By evaluating the distance between the hands and the protection area Z2, the system supplies indicators on the hand actions of the operator in terms of safety.

In order to simplify the projections, it is possible to only project the alarm area Z3 in 2D (two dimensions) onto the worktop of the cutting table.

Furthermore, the positional adjustment means of the lateral guide described, namely the spigots and the end stops, may be replaced by any known means, for example hooks, rings, notched rods, etc.

Furthermore, visual cutting aids may be projected by the videoprojector. The assistance manifests itself by the displaying of visual guides (arrows, information) and/or by the disabling of certain steps for configuration of the machine. For example, in "beginners" mode, the operator does not have to manage the start-up/the shutdown of the machine and goes directly to the execution of the expected cutting actions, the videoprojector projecting the ideal position of the hands onto the worktop ("explicit guidance"). In "advanced" mode, the operator cannot execute the cutting action until the configuration has been completed ("implicit guidance"). Lastly, in "expert" mode, if the operator chooses to execute a cutting action while the machine has not been fully set up, the exercise is stopped ("no assistance").

Furthermore, in order to mask the workpiece to be cut up, as an alternative to the projection of a fuzzy region around the hands during an adjustment phase, a processing for subtraction of images of the hands of the operator may be carried out in the monitoring imaging by the digital management unit so as to mask the workpiece to be cut up image by image.

In addition, aside from the tracking of the hands and of the head, it is possible to provide a camera which senses the silhouette of the operator without markers (same principle as the "Kinect" for the control of video games) in order to monitor the overall posture of the operator and to reproduce it in the form of a wire skeleton.

Furthermore, it is possible to provide a communication of data between several management units, each being situated on a platform, and a single server and to deliver the pages of the "training" portal onto any computer or terminal via a local network or the Internet and an access protocol for an exchange of data, for example for storing skills results data on the server.

This communication may be chosen from between an autonomous mode, in which the management unit and the dedicated server are hosted on the same website, a connected mode for several management units in which a site operates in autonomous mode and the other management units are connected to the server via a local network and the Internet (or only the local network or only the Internet), and a server mode in which the server communicates with the management units via a local network and the Internet (or only the local network or only the Internet).

The invention claimed is:

1. A method for learning to cut non-metallic materials, the method comprising the steps of:
    selecting a cutting exercise from a digital management device, wherein the cutting exercise is selected from a list of cutting exercises stored on the digital management unit, wherein each cutting exercise includes a cutting mechanism;
    providing a user with 3D glasses, a head tracker, and hand trackers;
    projecting by using a video projector, a stereoscopic image associated with the selected cutting exercise onto a cutting table, the stereoscopic image is visualized by the user by wearing the 3D glasses;
    placing a workpiece to be virtually cut up on the cutting table, the workpiece includes at least one magnetic interaction face and at least one tracker, the workpiece is made of a material as required by the cutting exercise, the materials being defined by at least one hardness image;
    sensing by using a stereoscopic imaging device the position of the user's hand, head and the workpiece;
    projecting at least one safety area around the cutting mechanism, the safety is projected by the video projector;
    orienting the workpiece to correspond to a virtual image of a virtual workpiece projected by the stereoscopic image;
    projecting a virtual guide onto the cutting table by using the video projector;
    superposing a lateral guide on the cutting table with the virtual guide;
    pushing the workpiece against the lateral guide and moving the workpiece through a blade on the cutting mechanism;
    exerting an electromagnetic reaction force to the at least one magnetic interaction face of the moving workpiece, the electromagnetic reaction force is generated by electromagnets located on the cutting table and controlled by the management device;
    a learning level of the user is evaluated by an analysis of the execution of the exercise on the basis of rate of success of criteria relating to the cut regularity and/or the speed of execution, the positioning of the user with respect to an ideal positioning and, the adherence to safety with regard to the proximity of the safety area or areas (Z1 to Z3).

2. The method as claimed in claim 1, further including the step of projecting a stereoscopic image of the workpiece to be virtually cut up onto the workpiece (70 to 74).

3. The method as claimed in claim 1, wherein when the material of the workpiece is wood, the intensity of the electromagnetic reaction force is weighted by a hardness image of the wood at a given cut point corresponding to a mean hardness of an image of material extruded perpendicularly to the surface of the cutting table up to the level of this point by the management device.

4. The method according to claim 1, wherein vibrations corresponding to the virtual cutting of said workpiece are generated on the cutting mechanism.

5. The method according to claim 1, wherein further including the step of providing an audio alarm, where the audio alarm is controlled by the intensity of the electromagnetic reaction force and vibrations generated to the hardness of the workpiece, and/or to the cutting mechanism.

6. The method as claimed in claim 1, wherein an accident area is defined within the safety area in the immediate proximity of the cutting mechanism, and the reaction force is stopped and/or the exercise is halted when the workpiece enters the accident area.

7. The method as claimed in claim 1, further comprising the step of projecting a shadow area as a stereoscopic image onto the hands of the user in order to mask the workpiece to be cut up.

8. The method as claimed in claim 1, wherein the management device is in communication with a server which stores teaching data and common data in the execution of various cutting exercises.

9. The method as claimed in claim 8, wherein the server hosts a training portal site accessible by a connection via a local network or the Internet, wherein the management device is responsible for delivering access to the training portal to at least one terminal via an access protocol.

10. The method as claimed in claim 8, wherein the communication of data between the management device and the server is chosen from:
   between an autonomous mode, in which the management device and the dedicated server are hosted on the same website;
   a connected mode for several management devices in which a site operates in autonomous mode and the other management devices are connected to the server via a local network and/or the Internet; and
   a server mode in which the server communicates with the management devices via a local network and/or the Internet.

11. A platform for learning to cut non-metallic materials, the platform comprising:
   a cutting table;
   a cutting machine placed on the cutting table;
   a lateral cutting guide located on the cutting table;
   at least one digital management device, the digital management device stores a plurality of cutting exercises, each cutting exercise having a cutting mechanism;
   a stereoscopic video projector (60) located on the cutting table, the stereoscopic video projector in communication with the at least one digital management device;
   a stereoscopic camera located on the cutting table, the stereoscopic camera in communication with the at least one digital management device,
   a control and monitoring screen in communication with the at least one digital management device and the stereoscopic camera;
   at least one workpiece to be virtually cut up, the workpiece includes at least one magnetic interaction face and at least one tracker, the workpiece is made of a material as required by the cutting exercise and is covered with a ferromagnetic layer, the materials being defined by at least one hardness image;
   3D glasses, a head tracker, and hand trackers adapted to be worn by a user;
   an electromagnet located on the cutting mechanisms and controlled by the management device, the electromagnet interacts with the at least one magnetic face of the workpiece;
   wherein the video projector projects a stereoscopic image associated with the selected cutting exercise onto the cutting table, the stereoscopic image is visualized by the user by wearing the 3D glasses;
   wherein at least one safety area is projected around the cutting mechanism, the safety is projected by the stereoscopic video projector;
   wherein the video projector projects a virtual guide onto the cutting table;
   wherein the workpiece is oriented by the user to correspond to a virtual image of a virtual workpiece projected by the stereoscopic image;
   wherein said stereoscopic video projector works in combination with the stereoscopic camera for monitoring said workpiece and the user executing a cutting exercise on said cutting table;
   wherein the stereoscopic monitoring camera senses the trackers on the hands and head of the user and the workpiece;
   wherein on a working position the user superposes the lateral guide on the cutting table with the virtual guide and then pushes the workpiece against the lateral guide and moves the workpiece through a blade on the cutting mechanism.

12. The platform as claimed in claim 11, further including a vibrating mechanism placed on the cutting mechanisms, the vibrating mechanism is controlled by the at least one digital management device according to the cutting exercise, the cutting machines, the cutting mechanisms, and a density of the materials of the workpiece.

13. The platform as claimed in claim 12, further including at least one loudspeaker controlled by the at least one digital management device as a function of the intensity of the electromagnet and of the vibrating mechanism.

14. The platform as claimed in claim 11, further including an alarm controlled by the at least one digital management device, the alarm stops the electromagnet and/or the cutting exercise when the workpiece enters the safety area.

15. The platform as claimed in claim 11, further including a worktop on the cutting table, the worktop is covered with a highly reflective coating in order to optimize the stereoscopic projection.

16. The platform as claimed in claim 11, wherein the video projector projects visual aids for the cutting exercise.

17. The platform as claimed in claim 15, further including a server connected to the at least one digital management device, the server stores a data that is transmitted via a local network or the Internet.

* * * * *